(12) United States Patent
Billhartz

(10) Patent No.: US 7,581,095 B2
(45) Date of Patent: Aug. 25, 2009

(54) MOBILE-AD-HOC NETWORK INCLUDING NODE AUTHENTICATION FEATURES AND RELATED METHODS

(75) Inventor: Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/197,148

(22) Filed: Jul. 17, 2002

(65) Prior Publication Data

US 2004/0015689 A1 Jan. 22, 2004

(51) Int. Cl.
H04L 9/00 (2006.01)

(52) U.S. Cl. ........................ 713/168; 713/153; 713/156; 713/170; 713/171

(58) Field of Classification Search .................. 380/30, 380/285; 713/156, 181
See application file for complete search history.

(56) References Cited

U.S. PATENT DOCUMENTS

| | | | | |
|---|---|---|---|---|
| 5,371,794 | A * | 12/1994 | Diffie et al. | 713/156 |
| 5,402,490 | A * | 3/1995 | Mihm, Jr. | 380/247 |
| 5,412,654 | A | 5/1995 | Perkins | 340/94.1 |
| 5,515,441 | A * | 5/1996 | Faucher | 380/30 |
| 5,539,824 | A * | 7/1996 | Bjorklund et al. | 380/249 |
| 5,923,756 | A * | 7/1999 | Shambroom | 713/156 |
| 5,974,550 | A * | 10/1999 | Maliszewski | 713/200 |
| 6,092,200 | A * | 7/2000 | Muniyappa et al. | 713/201 |
| 6,246,771 | B1 * | 6/2001 | Stanton et al. | 380/286 |
| 6,292,896 | B1 * | 9/2001 | Guski et al. | 713/169 |
| 6,304,556 | B1 | 10/2001 | Haas | 370/254 |
| 6,405,313 | B1 * | 6/2002 | Reiter et al. | 713/156 |
| 6,430,690 | B1 * | 8/2002 | Vanstone et al. | 713/182 |
| 6,546,425 | B1 * | 4/2003 | Hanson et al. | 709/227 |
| 6,574,730 | B1 * | 6/2003 | Bissell et al. | 713/168 |
| 7,096,359 | B2 * | 8/2006 | Agrawal et al. | 713/168 |
| 7,281,057 | B2 * | 10/2007 | Cain | 709/238 |

OTHER PUBLICATIONS

Schneier, Bruce; Applied Cryptography; 1996; John Wiley & Sons, Inc.; Second Edition; pp. 47-75, 169-187.*

(Continued)

*Primary Examiner*—Jung Kim
(74) *Attorney, Agent, or Firm*—Allen, Dyer, Doppelt, Milbrath & Gilchrist, P.A.

(57) ABSTRACT

A mobile ad-hoc network may include a first node having a first public key and a first private key associated therewith for generating an authentication request. The network may also include a second node having a second public key and a second private key associated therewith for receiving the authentication request and returning a certificate of authenticity including the second public key to the first node. Upon verifying that the second public key belongs to the second node, the first node may send challenge data to the second node, and the second node may encrypt the challenge data using the second private key and return the encrypted challenge data back to the first node. The first node may thus decrypt the encrypted challenge data using the verified second public key and authenticate the second node if the decryption of the encrypted challenge data yields the original challenge data.

31 Claims, 5 Drawing Sheets

OTHER PUBLICATIONS

Stallings, William; Cryptography and Network Security; 1999; Prentice-Hall, Inc.; Second Edition; pp. 131-159, 173-182, 323-353, 299-319.*

Nguyen, Dan; Zhao, Li; Uisawang, Pra-ornsiri; Platt, John; Security Routing Analysis for Mobile Ad Hoc Networks; Spring 2000; Department of Interdisciplinary Telecommunications, University of Colorado at Boulder.*

Zhou, Lidong; Haas, Zygmunt J.; Securing Ad Hoc Networks; IEEE Network Magazine, vol. 13, No. 6; Nov./Dec. 1999.*

Stallings, William; Cryptography and Network Security; Jun. 4, 1998; Prentice Hall, Inc.; $2^{nd}$ Edition; pp. 163-206.*

Nguyen et al., *Security Routing Analysis for Mobile Ad Hoc Networks,* Department of Interdisciplinary Telecommunications, University Of Colorado at Boulder, Spring 2000.

Zhou et al., *Securing Ad Hoc Networks,* IEEE Network Magazine, vol. 13, No. 6, Nov./Dec. 1999.

Tyson, *How Encryption Works,* Howstuffworks, Inc., available at www.howstuffworks.com.

* cited by examiner

MOBILE-AD-HOC NETWORK INCLUDING NODE AUTHENTICATION FEATURES AND RELATED METHODS

FIELD OF THE INVENTION

The present invention relates to the field of communications, and, more particularly, to mobile ad-hoc networks and related methods.

BACKGROUND OF THE INVENTION

Wireless networks have experienced increased development in the past decade. One of the most rapidly developing areas is mobile ad-hoc networks. Physically, a mobile ad-hoc network includes a number of geographically-distributed, potentially mobile nodes sharing a common radio channel. Compared with other types of networks, such as cellular networks or satellite networks, the most distinctive feature of mobile ad-hoc networks is the lack of any fixed infrastructure. The network may be formed of mobile nodes only, and a network is created "on the fly" as the nodes come close enough to transmit with each other. The network does not depend on a particular node and dynamically adjusts as some nodes join or others leave the network.

Because of these unique characteristics, routing protocols for governing data flow within ad-hoc networks are required which can adapt to frequent topology changes. Two basic categories of ad-hoc routing protocols have emerged in recent years, namely reactive or "on-demand" protocols, and proactive or table-driven protocols. Reactive protocols collect routing information when a particular route is required to a destination in response to a route request. Examples of reactive protocols include ad-hoc on demand distance vector (AODV) routing, dynamic source routing (DSR), and the temporally ordered routing algorithm (TORA).

On the other hand, proactive routing protocols attempt to maintain consistent, up-to-date routing information from each node to every other node in the network. Such protocols typically require each node to maintain one or more tables to store routing information, and they respond to changes in network topology by propagating updates throughout the network to maintain a consistent view of the network. Examples of such proactive routing protocols include destination-sequenced distance-vector (DSDV) routing, which is disclosed in U.S. Pat. No. 5,412,654 to Perkins; the wireless routing protocol (WRP); and clusterhead gateway switch routing (CGSR). A hybrid protocol which uses both proactive and reactive approaches is the zone routing protocol (ZRP), which is disclosed in U.S. Pat. No. 6,304,556 to Haas.

One challenge to the advancement of ad-hoc network development is that of security. In particular, since nodes are continuously entering and exiting a mobile ad-hoc network the task of ensuring that a node is a trustworthy source for data exchange can be difficult. Because of the early stage of development of ad-hoc networks and the numerous other challenges these networks present, the above routing protocols have heretofore primarily focused solely on the mechanics of data routing and not on such node authentication.

Some approaches are now being developed for performing node authentication within mobile ad-hoc networks. One such approach is outlined in a Capstone Proceeding paper by Nguyen et al. entitled "Security Routing Analysis for Mobile Ad Hoc Networks," Department of Interdisciplinary Telecommunications, University Of Colorado at Boulder, Spring 2000. In this paper, the authors suggest using the U.S. Data Encryption Standard (DES) for encrypting plain text messages. For authentication, digital signatures and keyed one-way hashing functions with windowed sequence numbers are proposed.

More particularly, public-key encryption is used along with a one-way hash function to provide the digital signature. The sender uses the one-way hash function on the message and then encrypts the hash value with their private key. The message, along with the encrypted hash value, is sent to its destination. At the receiver, the hash value is also calculated based upon the message and is compared with the received hash value that was decrypted with the sender's public key. If they are the same, then the signature is authenticated.

Furthermore, rather than using a centralized (i.e., single) key management authority, a distributed public key management approach is suggested wherein a set of "trustworthy" nodes are designated that share sections of the public key management system. Each trusted node keeps a record of all public keys in the network, and the number of nodes needed to generate a valid signature is less than the total number of trusted nodes.

Another similar public/private key approach is discussed in an article by Zhou et al. entitled "Securing Ad Hoc Networks," IEEE Network Magazine, vol. 13, no. 6, November/December 1999. This approach provides for a key management service which, as a whole, has a public/private key pair. All nodes in the system know the public key of the management service and trust any certificates signed using the corresponding private key. Nodes, as clients, can submit query requests to get other clients' public keys or submit update requests to change their own public keys. Internally, the key management service includes n special nodes called servers present within the ad-hoc network. Each server also has its own key pair and stores the public keys of all the nodes in the network. In particular, each server knows the public keys of other servers. Thus, the servers can establish secure links among themselves.

While the above papers address some aspects of implementing public/private key encryption and authentication in mobile ad-hoc networks, there are still further issues that remain to be addressed. For example, a would-be hacker could surreptitiously pose as an existing node in the network and lure a sending node to mistakenly send data thereto. Unless certain measures are taken, the hacker could act as a "man-in-the-middle" and forward authentication messages (and responses) to the intended destination. As a result, messages could still be altered and/or discarded, potentially crippling network communication.

SUMMARY OF THE INVENTION

In view of the foregoing background, it is therefore an object of the present invention to provide a mobile ad-hoc network with node authentication features and related methods.

This and other objects, features, and advantages in accordance with the present invention are provided by a mobile ad-hoc network which may include a first node for generating an authentication request which has a first public key and a first private key associated therewith. The network may also include a second node having a second public key and a second private key associated therewith. The first node may receive a certificate of authenticity responsive to the authentication request generated by a certifying authority and including the second public key. The certifying authority may have a public authentication key and a private authentication key associated therewith and generate the certificate of authenticity using the private authentication key.

In addition, the first node may decrypt the certificate of authenticity using the public authentication key and verify that the second public key belongs to the second node based upon the decrypted certificate of authenticity. Also, the first node may send challenge data (e.g., random challenge data) to the second node upon verification that the second public key belongs to the second node. Thus, the second node may encrypt the challenge data using the second private key and return the encrypted challenge data back to the first node. As such, the first node may decrypt the encrypted challenge data using the verified second public key and authenticate the second node if the decryption of the encrypted challenge data yields the original challenge data. Accordingly, the first node can therefore advantageously verify that it is indeed communicating with the second node, which has been verified by the certifying authority.

More particularly, the certificate of authenticity may further include a node identification (ID) of the second node. As such, the first node may verify the second public key belongs to the second node by processing the second node ID and the second public key to create a digest, and comparing the digest with the decrypted certificate of authenticity to verify that the second public key belongs to the second node. By way of example, the first node may process the second node ID and the second public key using a hashing algorithm.

Additionally, the first node may, upon authenticating the second node, send a session key to the second node that is encrypted with the second public key for use with subsequent data transfers therebetween. The session key may be a random session key, for example. The use of the session key advantageously reduces the likelihood of an unauthorized man in the middle from being able to interfere message data sent between the first and second nodes. That is, only the true second node will be able to decrypt the session key that will be used for sending message data between the first and second nodes.

Further, the first node may also terminate the authentication of the second node after a predetermined period so that the authentication is kept current. The certificate of authenticity may also include a time of authentication by the certifying authority, for example. In addition, the first and second nodes may communicate using the dynamic source routing (DSR) protocol, and they may also transfer message data therebetween upon authentication of the second node by the first node. Also, the first node may send the authentication request to the second node, and the second node may return the certificate of authenticity to the first node responsive thereto. In other embodiments, the first node may send the authentication request to the certifying authority and receive the authentication request therefrom.

A node authentication method aspect of the invention is for a mobile ad-hoc network including a plurality of nodes. The method may include generating an authentication request at a first node having a first public key and a first private key associated therewith to authenticate a second node having a second public key and a second private key associated therewith. Responsive to the authentication request, the first node may receive a certificate of authenticity generated by a certifying authority and including the second public key. The certifying authority may have a public authentication key and a private authentication key associated therewith and generate the certificate of authenticity using the private authentication key.

The method may further include decrypting the certificate of authenticity at the first node using the public authentication key and verifying that the second public key belongs to the second node based upon the decrypted certificate of authenticity. In addition, challenge data may be sent from the first node to the second node upon verification that the second public key belongs to the second node. The challenge data may be encrypted at the second node using the second private key, and the encrypted challenge data returned back to the first node. Also, the method may further include decrypting the encrypted challenge data at the first node using the verified second public key and authenticating the second node if the decryption of the encrypted challenge data yields the original challenge data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1-7, a mobile ad-hoc network 10 in accordance with the invention illustratively includes a first node 11 and a second node 12. While only the first and second nodes 11, 12 are shown for clarity of illustration, it will be understood by those of skill in the art that any number of nodes may be included within the mobile ad-hoc network 10. Fixed nodes may also be included in the mobile ad-hoc network 10 in some embodiments to provide a bridge between the network and a communications infrastructure (e.g., a telephone or cellular network), as will also be understood by those of skill in the art. Of course, such fixed nodes are not required.

In the illustrated example, the first node 11 is an authenticating node in that it is attempting to establish the authenticity or trustworthiness of the second, unauthenticated node 12. The second node 12 may be unauthenticated, for example, because it recently entered the network 10, either by being powered on or by coming in range of the network. As noted above, mistakenly sending messages to an unauthenticated node could result in tampering, lost messages, or worse. Thus, in accordance with the invention, the first node 11 will preferably seek to establish the authenticity of the second node 12 (as well as other unauthenticated nodes) before sending message data thereto.

Figure 2:
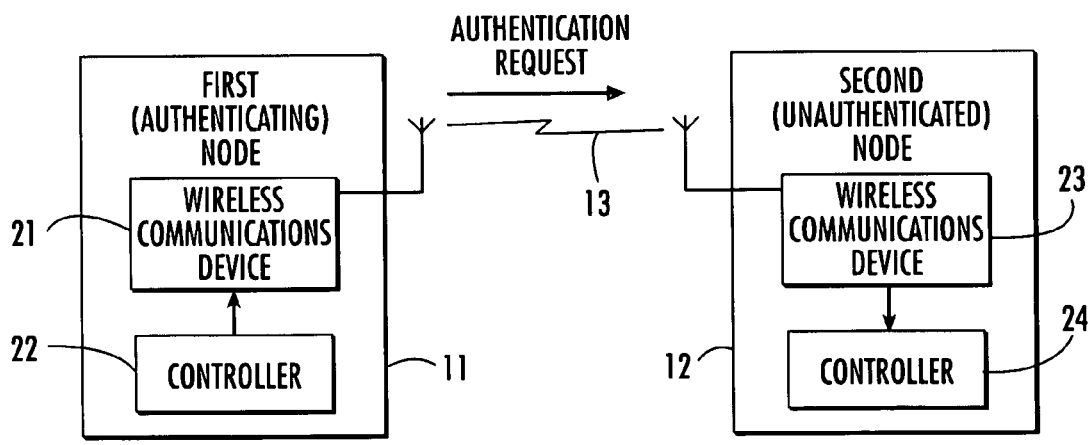
FIGS. 2-7 are more detailed schematic block diagrams of the first and second nodes of the mobile ad-hoc network of FIG. 1 and further illustrating the process of node authentication therebetween in accordance with the present invention.
Figure 3:
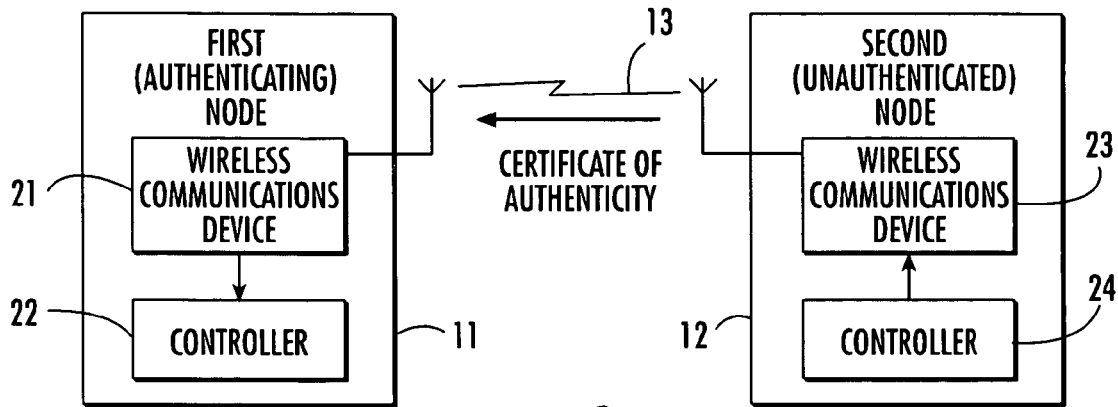

To establish the authenticity of the second node 12, the first node 11 generates an authentication request which it sends to the second node (FIG. 2). As illustratively shown, the first node 11 includes a wireless communications device 21 and a controller 22 that cooperates with the wireless communications device to establish a wireless communications link 13 to the second node 12, as will be appreciated by those of skill in the art. The second node 12 similarly includes a wireless communications device 23 and a controller 24.

By way of example, the first and second nodes 11, 12 may be laptop computers, personal data assistants (PDAs), or any other devices suitable for use in mobile ad-hoc networks, as will be appreciated by those of skill in the art. As such, the wireless communications devices 21, 23 may be wireless modems, cellular devices, etc., and the controllers 22, 24 may be microprocessors, for example.

In accordance with the invention, node authentication is based upon public/private key encryption. More particularly, the first node 11 has a first public key and a first private key associated therewith, and the second node 12 has a second public key and a second private key associated therewith, as will be appreciated by those of skill in the art. Upon receiving the authentication request from the first node 11, the second node 12 returns a certificate of authenticity to the first node, as illustratively shown in FIG. 3.

Figure 1:
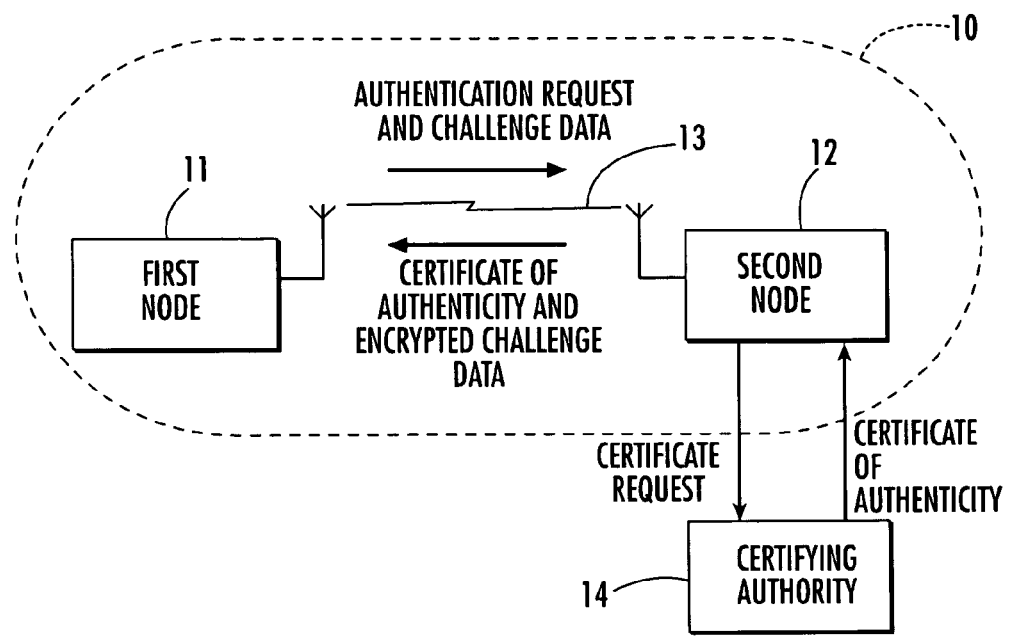
FIG. 1 is schematic block diagram of a mobile ad-hoc network in accordance with the present invention.

The certificate of authenticity is generated by a certifying authority 14 and may be provided to the second node 12 upon request, as illustratively shown in FIG. 1. Preferably, this would be done when the second node 12 enters the network 10, and it could be updated at certain intervals thereafter. Of course, the second node 12 could request the certificate of authenticity upon receiving the authentication request from the first node 11, but this will increase the time required for the first node to authenticate the second node and may therefore not be desirable in certain applications.

As briefly described above, in typical prior art approaches using public and private key encryption (such as in Internet security applications, for example), a certifying authority is established as a trusted source from which users can obtain public keys for other users with which they wish to communicate. In accordance with the invention, the certifying authority 14 preferably generates a certificate of authentication for the second node 12 which includes the second public key and a node identification (ID) of the second node.

In particular, the certifying authority 14 has its own public authentication key and private authentication key associated therewith, and it generates the certificate of authenticity using the private authentication key to encrypt the second public key and second node ID. The certifying authority 14 may be a single node in the network 10, or a plurality of nodes may share this responsibility as proposed in the above papers by Nguyen et al. and Zhou et al., both of which are hereby incorporated herein in their entireties by reference.

Another approach to providing the certifying authority 14 is to group nodes in the network 10 into clusters each having a designated cluster leader node, as described in co-pending U.S. patent application Ser. No. 10/134,559, filed Apr. 29, 2002, and assigned to the Harris Corporation, assignee of the present application, which is hereby incorporated herein in its entirety by reference. Thus, the certifying authority responsibility could be distributed to the cluster leader nodes, as will be appreciated by those of skill in the art.

Upon receiving the certificate of authenticity (FIG. 3), the first node 11 decrypts the certificate of authenticity using the public authentication key of the certifying authority 14, which is generally known by all of the nodes in the network 10. This is done to verify that the second public key belongs to the second node 12. More particularly, the first node 11 verifies the second public key belongs to the second node 12 by processing the second node ID and the second public key to create a digest. By way of example, the first node 11 may process the second node ID and the second public key using a hashing algorithm to create the digest. The digest may then be compared with a digest of the decrypted certificate of authenticity to verify that the second public key belongs to the second node 12, as will be understood by those of skill in the art.

By performing the foregoing steps, the first node 11 is able to verify that it is communicating with a node that has a certificate of authenticity from a trustworthy source (i.e., the certifying authority 14), and that it has the correct second public key for the second node 12. Yet, at this point it is still possible that the information the first node 11 is receiving is not from the true node 12. That is, a would-be hacker posing as the second node 12 could have previously intercepted the certificate of authenticity and provided this certificate to the first node 11 in response to the authentication request. As such, typical prior art public/private key encryption approaches, such as those noted above, which rely solely upon a certificate of authenticity could still be susceptible to compromise.

Figure 4:
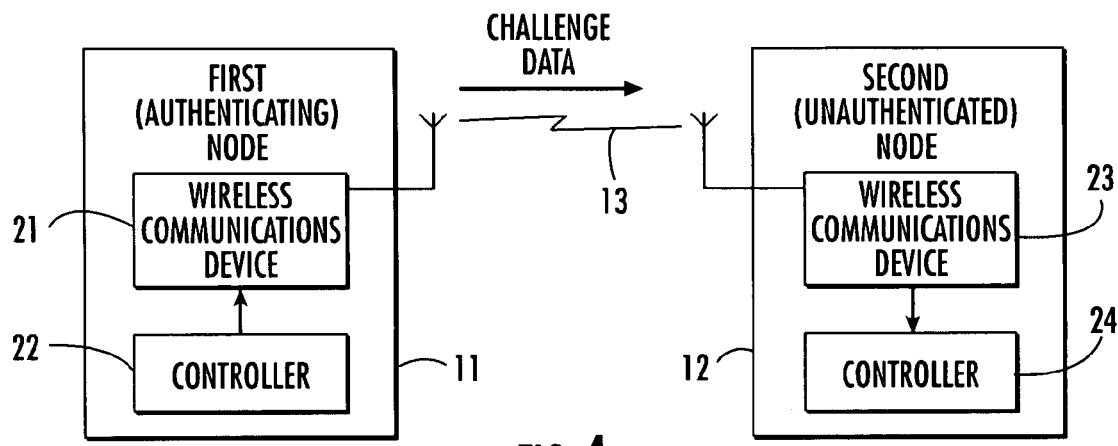
Figure 5:
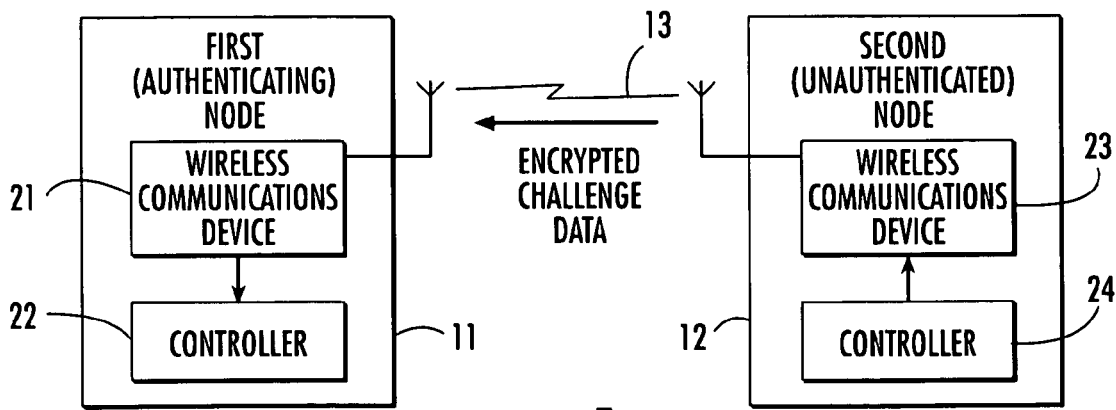

In accordance with the present invention, the first node 11 preferably sends challenge data to the second node 12 upon verification that the second public key belongs to the second node (FIG. 4). The second node 12 will then encrypt the challenge data using the second private key and return the encrypted challenge data back to the first node 11 (FIG. 5). By way of example, the challenge data may be randomly generated to provide yet additional security, as will be appreciated by those of skill in the art. Of course, other types of challenge data may also be used.

Accordingly, the first node 11 decrypts the encrypted challenge data using the previously verified second public key and authenticates the second node 12 if the decryption of the encrypted challenge data yields the original challenge data. The first node 11 can therefore advantageously verify that it is indeed communicating with the second node 12, and it has already been established that the second node has been verified by the certifying authority 14. The only remaining security breach to guard against at this point is that of a man in the middle intercepting and potentially repeating or otherwise tampering with messages, for example.

Figure 6:
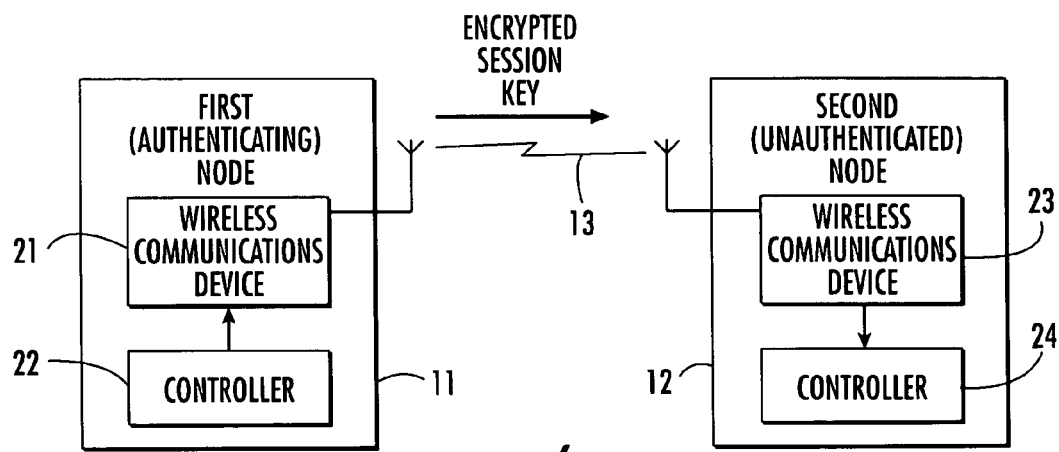

To reduce the likelihood of such an occurrence, in some embodiments the first node 11 also sends a session key to the second node 12 that is encrypted with the second public key (FIG. 6). Because it is encrypted with the second public key, only the second node (which has the second private key) can decrypt and determine the session key. This session key may then be used for subsequent data transfers between the first and second nodes 11, 12 to provide symmetric data encryption.

As such, the use of the session key advantageously reduces the likelihood of an unauthorized man in the middle from being able to intercept and decrypt message data sent between the first and second nodes 11, 12. That is, only the true second node 12 will be able to decrypt the session key that will be used for sending message data between the first node 11 and the second node. The session key may be a random session key, for example, but here again any suitable type (or size) of session key known to those of skill in the art may also be used.

In some embodiments, the first node 11 preferably terminates the authentication of the second node after a predetermined period so that the authentication is kept current. Similarly, the certificate of authenticity may also include a time of authentication (which may include the date) by the certifying authority 14, for example. Here again, this is another approach to keep the authentication current, which can be extremely important in the mobile ad-hoc network context where nodes are continuously entering and exiting the network.

Other information that may be included in the certificate of authenticity in other embodiments include a media access layer (MAC) address, an Internet Protocol (IP) address, and/or a personal computer (PC) identification. Of course, one or more of the above security measures and/or types of certificate information may be used in various embodiments depending upon the level of security and network performance required, as will be understood by those of skill in the art.

Figure 7:
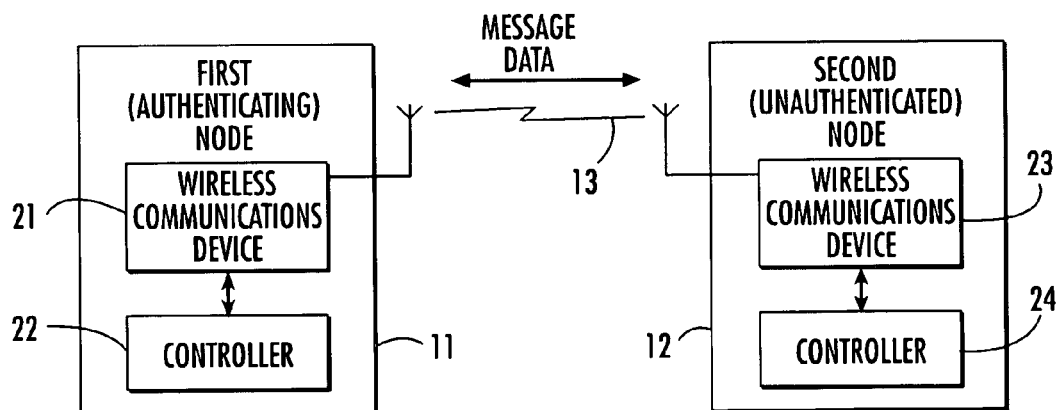

Once the second node 12 has been properly authenticated and, optionally, the session key distributed thereto, the first node 11 and the second node may transfer message data therebetween in accordance with the given mobile-ad hoc protocol begin used (FIG. 7). As used herein, "message data" is intended to include any data that may be sent between nodes in a mobile ad-hoc network during normal operation, including (but not limited to) route requests/replies, video data, audio data, alphanumeric data, etc. By way of example, if the present invention is implemented with the dynamic source routing (DSR) protocol, then the first node 11 would preferably only authenticate the second node 12 and leave any downstream authentication to the downstream nodes. Stated alternately, once the first node 11 establishes the trustworthiness of the second node 12, it would rely on the second node 12 to authenticate the next node along a route, and so on until all of the nodes along a particular route were authenticated. Of course, those of skill in the art will appreciate that the present invention may be implemented with other suitable mobile ad-hoc network protocols as well, such as those previously noted above, for example.

Figure 8:
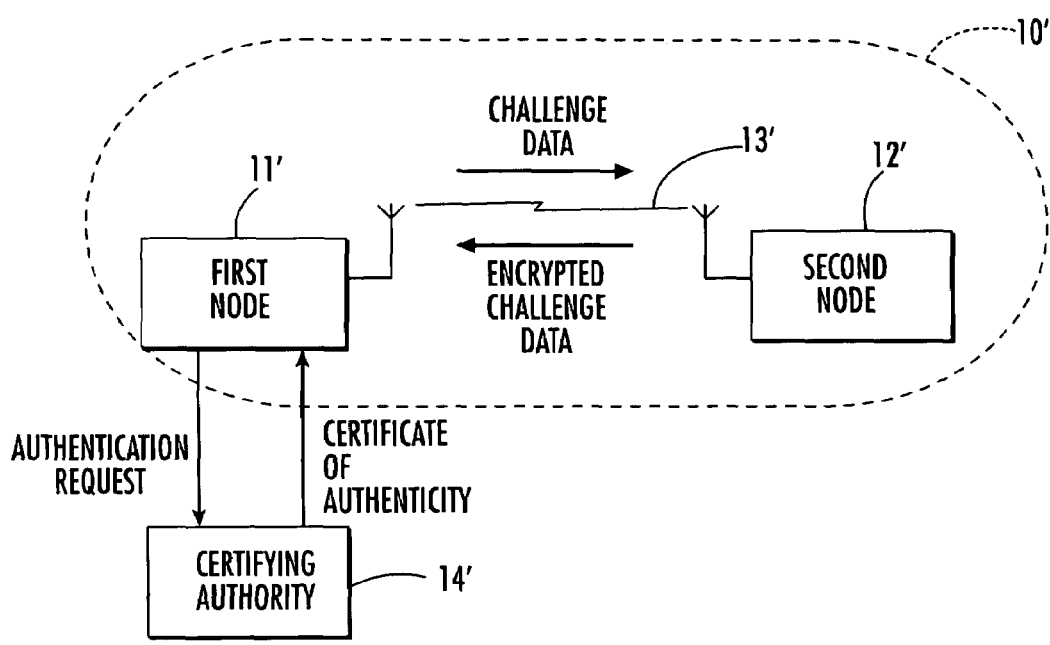
FIG. 8 is a schematic block diagram of an alternate embodiment of the mobile ad-hoc network of FIG. 1.

In the above-described example, the first node 11 sends the authentication request to the second node 12 and the second node returns the certificate to the first node. In such case, the second node 11 will have previously obtained the certificate of authenticity from the certifying authority 14 or it will do so responsive to the authentication request. In the alternate embodiment illustrated in FIG. 8, the first node 11' sends the authentication request to the certifying authority 14' and receives the certificate of authenticity directly therefrom, as will be appreciated by those of skill in the art. Furthermore, the second node 12' may similarly authenticate the first node 11' prior to message data being sent therebetween. That is, a two-way authentication may be used in certain embodiments, if desired. The remaining elements illustrated in FIG. 8 are similar to those previously noted above and will therefore not be discussed further herein.

Figure 9:
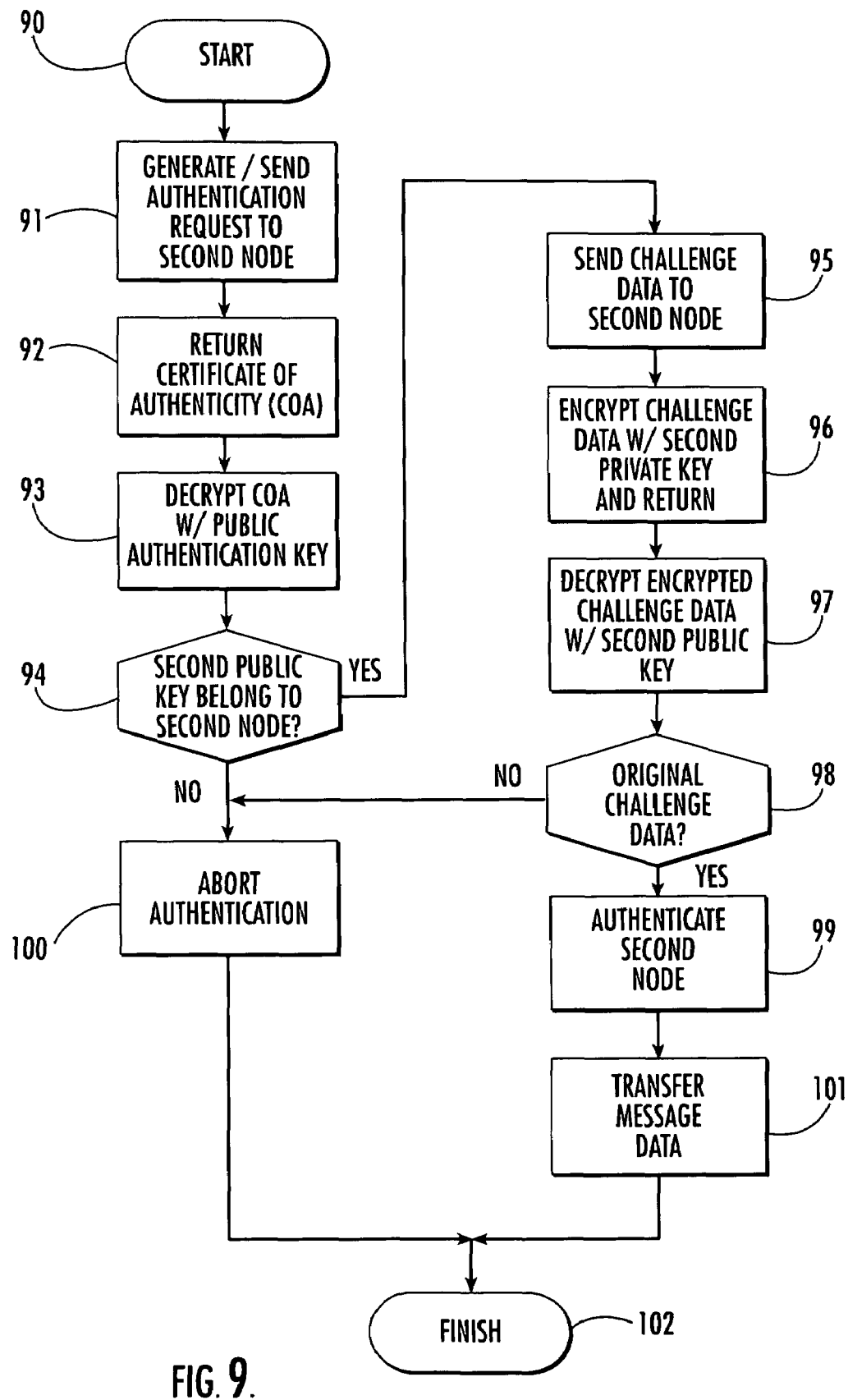
FIG. 9 is a flow diagram illustrating a mobile ad-hoc network node authentication method in accordance with the present invention.

A node authentication method aspect of the invention for the mobile ad-hoc network 10 is now described with reference to FIG. 9. The method begins (Block 90) by generating an authentication request at first node 12 having a first public key and a first private key associated therewith, and sending the authentication request from the first node to a second node 12 having a second public key and a second private key associated therewith, at Block 91. Further, a certificate of authenticity is returned from the second node 12 to the first node 11, at Block 92.

The certificate of authenticity is preferably generated by the certifying authority 14 and include the second public key, as noted above. Again, the certifying authority has a public authentication key and a private authentication key associated therewith and generates the certificate of authenticity using the private authentication key. Of course, in some embodiments the certificate of authenticity may be obtained directly from the certifying authority by the first node 11, as previously discussed above.

The method may further include decrypting the certificate of authenticity at the first node 11 using the public authentication key, at Block 93, and verifying that the second public key belongs to the second node 12 based upon the decrypted certificate of authenticity, at Block 94. If it does not, the first node will abort the authentication process (Block 100) and will not authenticate the second node 12. As such, no message data will be sent to the second node 12, thus concluding the method (Block 102). On the other hand, if it is verified that the second public key indeed belongs to the second node 12, challenge data is sent from the first node 11 to the second node, at Block 95. The challenge data is then encrypted at the second node 12 using the second private key, and the encrypted challenge data returned back to the first node, at Block 96.

Also, the method further includes decrypting the encrypted challenge data at the first node 11 using the verified second public key, at Block 97. If the decryption of the encrypted challenge data yields the original challenge data (Block 98), as described above, then the second node 12 is authenticated by the first node 11, at Block 99, and the transfer of message data therebetween may begin (Block 101). Otherwise, the first node 11 will abort the authentication process as described above (Block 100) and thus will not authenticate or send any message data to the second node 12. Further method aspects of the invention will be apparent to those of skill in the art based upon the above description and will therefore not be discussed further herein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network (MANET) comprising:
   a first cluster of MANET nodes comprising a first cluster leader node;
   a second cluster of MANET nodes comprising a second cluster leader node;
   a first MANET node from said first cluster for generating an authentication request, said first MANET node having a first public key and a first private key associated therewith; and
   a second MANET node from said second cluster having a second public key and a second private key associated therewith;
   said first MANET node receiving a certificate of authenticity via said first cluster leader node responsive to the authentication request, the certificate of authenticity being generated by said second cluster leader node and comprising the second public key, said second cluster leader node having a public authentication key and a private authentication key associated therewith and generating the certificate of authenticity using the private authentication key;
   said first MANET node decrypting the certificate of authenticity using the public authentication key and verifying that the second public key belongs to said second MANET node based upon the decrypted certificate of authenticity;

said first MANET node sending challenge data to said second MANET node upon verification that the second public key belongs to said second MANET node;

said second MANET node encrypting the challenge data using the second private key and returning the encrypted challenge data back to said first MANET node;

said first MANET node decrypting the encrypted challenge data using the verified second public key and authenticating said second MANET node if the decryption of the encrypted challenge data yields the original challenge data;

said first MANET node sending a session key encrypted with the second public key to said second MANET node for use with subsequent data transfers therebetween upon authenticating said second MANET node.

2. The MANET of claim 1 wherein the certificate of authenticity further comprises a node identification (ID) of the second MANET node.

3. The MANET of claim 2 wherein said first MANET node verifies the second public key belongs to said second MANET node by:

processing the second node ID and the second public key to create a first digest; and comparing the first digest with a second digest associated with the decrypted certificate of authenticity to verify that the second public key belongs to said second MANET node.

4. The MANET of claim 3 wherein said first MANET node processes the second node ID and the second public key using a hashing algorithm.

5. The MANET of claim 1 wherein the session key comprises a random session key.

6. The MANET of claim 1 wherein said first MANET node terminates the authentication of said second MANET node after a predetermined period.

7. The MANET of claim 1 wherein the challenge data comprises randomly generated challenge data.

8. The MANET of claim 1 wherein the certificate of authenticity further comprises a time of authentication by said second cluster leader node.

9. The MANET of claim 1 wherein said first and second MANET nodes communicate using the dynamic source routing (DSR) protocol.

10. The MANET of claim 1 wherein said first and second MANET nodes transfer message data therebetween upon authentication of said second MANET node by said first MANET node.

11. The MANET of claim 1 wherein said first MANET node sends the authentication request to said second node, and wherein said second MANET node returns the certificate of authenticity to said first node responsive thereto via said first cluster leader node.

12. A mobile ad-hoc network (MANET) comprising:

a first cluster of MANET nodes comprising a first cluster leader node;

a second cluster of MANET nodes comprising a second cluster leader node;

a first MANET node from said first cluster for generating an authentication request, said first MANET node having a first public key and a first private key associated therewith; and a second MANET node from said second cluster having a second public key and a second private key associated therewith, said second MANET node for receiving the authentication request and returning a certificate of authenticity to said first MANET node via said first cluster leader node generated by said second cluster leader node and comprising the second public key, the second cluster leader node having a public authentication key and a private authentication key associated therewith and generating the certificate of authenticity using the private authentication key;

said first MANET node decrypting the certificate of authenticity using the public authentication key and verifying that the second public key belongs to said second MANET node based upon the decrypted certificate of authenticity;

said first MANET node sending challenge data to said second MANET node upon verification that the second public key belongs to said second MANET node;

said second MANET node encrypting the challenge data using the second private key and returning the encrypted challenge data back to said first MANET node;

said first MANET node decrypting the encrypted challenge data using the verified second public key and authenticating said second MANET node if the decryption of the encrypted challenge data yields the original challenge data;

said first MANET node sending a session key encrypted with the second public key to said second MANET node upon authenticating said second MANET node;

said first and second MANET nodes also transferring message data therebetween using the session key.

13. The MANET of claim 12 wherein the certificate of authenticity further comprises a node identification (ID) of the second MANET node.

14. The MANET of claim 13 wherein said first MANET node verifies the second public key belongs to said second MANET node by:

processing the second node ID and the second public key to create a first digest; and comparing the first digest with a second digest associated with the decrypted certificate of authenticity to verify that the second public key belongs to said second MANET node.

15. The MANET of claim 14 wherein said first MANET node processes the second node ID and the second public key using a hashing algorithm.

16. The MANET of claim 12 wherein the session key comprises a random session key.

17. The MANET of claim 12 wherein said first MANET node terminates the authentication of said second MANET node after a predetermined period.

18. The MANET of claim 12 wherein the challenge data comprises randomly generated challenge data.

19. The MANET of claim 12 wherein the certificate of authenticity further comprises a time of authentication by said certifying authority.

20. The MANET of claim 12 wherein said first and second nodes communicate using the dynamic source routing (DSR) protocol.

21. A node authentication method for a mobile ad-hoc network (MANET) comprising a plurality of MANET nodes, the method comprising:

forming a first cluster of MANET nodes comprising a first cluster leader node;

forming a second cluster of MANET nodes comprising a second cluster leader node;

generating an authentication request at a first MANET node having a first public key and a first private key associated therewith to authenticate a second MANET node having a second public key and a second private key associated therewith;

receiving a certificate of authenticity via the first cluster leader node responsive to the authentication request at the first MANET node, the certificate of authenticity being generated by the second cluster leader node and comprising the second public key, the second cluster leader node having a public authentication key and a private authentication key associated therewith and generating the certificate of authenticity using the private authentication key;

decrypting the certificate of authenticity at the first MANET node using the public authentication key and verifying that the second public key belongs to the second MANET node based upon the decrypted certificate of authenticity;

sending challenge data from the first MANET node to the second MANET node upon verification that the second public key belongs to the second MANET node;

encrypting the challenge data at the second MANET node using the second private key and returning the encrypted challenge data back to the first MANET node;

decrypting the encrypted challenge data at the first MANET node using the verified second public key and authenticating the second MANET node if the decryption of the encrypted challenge data yields the original challenge data; and sending a session key encrypted with the second public key from the first MANET node to the second MANET node for use with subsequent data transfers therebetween upon authenticating the second MANET node.

22. The method of claim 21 wherein the certificate of authenticity further comprises a node identification (ID) of the second MANET node.

23. The method of claim 22 wherein verifying that the second public key belongs to the second MANET node comprises:
  processing the second node ID and the second public key to create a first digest; and
  comparing the first digest with a second digest associated with the decrypted certificate of authenticity to verify that the second public key belongs to the second MANET node.

24. The method of claim 23 wherein processing comprises processing the second node ID and the second node public key using a hashing algorithm.

25. The method of claim 21 wherein the session key comprises a random session key.

26. The method of claim 21 further comprising terminating the authentication of the second MANET node after a predetermined period.

27. The method of claim 21 wherein the challenge data comprises randomly generated challenge data.

28. The method of claim 21 wherein the certificate of authenticity further comprises a time of authentication by the second cluster leader node.

29. The method of claim 21 wherein the first and second MANET nodes communicate using the dynamic source routing (DSR) protocol.

30. The method of claim 21 further comprising transferring message data between the first and second MANET nodes upon authentication of the second node by the first node.

31. The method of claim 21 further comprising sending the authentication request to the second MANET node; and wherein receiving the certificate of authenticity comprises receiving the certificate of authenticity from the second node via the first cluster leader node.

* * * * *